UNITED STATES PATENT OFFICE.

JOHANN CZERMAK, OF DUSSELDORF, GERMANY.

PROCESS OF MANUFACTURING ARTIFICIAL MARBLE.

SPECIFICATION forming part of Letters Patent No. 704,621, dated July 15, 1902.

Application filed April 19, 1901. Serial No. 56,571. (No specimens.)

*To all whom it may concern:*

Be it known that I, JOHANN CZERMAK, a citizen of the German Empire, and a resident of Dusseldorf, Germany, have invented certain new and useful Improvements in the Process of the Manufacture of Artificial Marble, of which the following is a specification.

This invention relates to an improved process of producing imitation marble slabs in which the veins do not appear only upon the surface, but penetrate the entire thickness of the slab.

For carrying my invention into effect I take a quantity of plaster, cement, mortar, or similar plastic material mixed with a suitable earthy or other pigment and form it into the body of the slab. This body is spread upon a smooth, curved, or other differently-shaped base-plate made, preferably, of glass. When the body has set somewhat, a liquid mass, composed of mortar or similar substance, is poured over the slab, such body corresponding in color to the color of the veins desired. The slab is now cracked by a chisel or similar instrument through its entire thickness to slightly displace its component parts upon the base-plate. In this way the liquid mass will enter the cracks and produce the artificial veins which penetrate from face to face and will closely resemble natural veins. If desired, the liquid mass may be poured upon the slab after the formation of the cracks. To produce two or more series of differently-colored veins, a number of new cracks or flaws are formed after the substance forming the first set of veins has set, and then a differently-colored mass is introduced into these new cracks. This process may be repeated until the desired variety in the coloration of the veins is attained. By properly handling the tool all the several varieties of marble veins may be strikingly imitated. In order to strengthen the artificial slab, it may be provided with a backing composed of a layer of plaster, cement, or other reinforcing material.

What I claim is—

The process of producing artificial marble which consists in forming a series of cracks through the entire thickness of a plastic body, filling said cracks with a differently-colored mass, allowing the mass to set, forming a second series of cracks in the plastic body, and filling said new cracks with a second differently-colored mass, substantially as specified.

Signed by me at Dusseldorf, Germany, this 4th day of April, 1901.

JOHANN CZERMAK.

Witnesses:
   P. LIEBER,
   WILLIAM ESSENWEIN.